United States Patent [19]
Hanauer et al.

[11] Patent Number: 5,174,119
[45] Date of Patent: Dec. 29, 1992

[54] PROCESS FOR CONTROLLING THE BOOST PRESSURE IN AN INTERNAL-COMBUSTION ENGINE SUPERCHARGED BY AN EXHAUST-GAS TURBOCHARGER OF ADJUSTABLE TURBINE GEOMETRY

[75] Inventors: Horst Hanauer, Althütte; Michael Kühn, Filderstadt, both of Fed. Rep. of Germany

[73] Assignee: Mercedes-Benz AG, Stuttgart, Fed. Rep. of Germany

[21] Appl. No.: 745,207

[22] Filed: Aug. 15, 1991

[30] Foreign Application Priority Data

Aug. 16, 1990 [DE] Fed. Rep. of Germany ....... 4025901

[51] Int. Cl.⁵ .............................. F02B 37/12
[52] U.S. Cl. .................................. 60/602
[58] Field of Search ................ 60/600, 601, 602, 603

[56] References Cited

U.S. PATENT DOCUMENTS

| | | |
|---|---|---|
| 2,944,786 | 7/1960 | Angell et al. . |
| 4,765,141 | 8/1988 | Hirabayashi .................. 60/602 |
| 4,773,225 | 9/1988 | Bachschmid et al. ............ 60/602 X |

FOREIGN PATENT DOCUMENTS

| | | |
|---|---|---|
| 2813638 | 11/1978 | Fed. Rep. of Germany . |
| 3507095 | 9/1985 | Fed. Rep. of Germany . |
| 3506303 | 10/1985 | Fed. Rep. of Germany . |
| 3515046 | 11/1985 | Fed. Rep. of Germany . |
| 3624248 | 1/1988 | Fed. Rep. of Germany . |
| 182438 | 8/1937 | Japan . |
| 176417 | 10/1983 | Japan ............................ 60/602 |
| 56127 | 4/1985 | Japan . |
| 182437 | 8/1987 | Japan . |
| 210222 | 9/1987 | Japan . |
| 2169349 | 7/1986 | United Kingdom ........... 60/602 |

OTHER PUBLICATIONS

"Variable-Geometry Turbo Increases Power, Minimizes Response Lag"-Automotive Engineering, Sep. 1985, pp. 70-72.

*Primary Examiner*—Michael Koczo
*Attorney, Agent, or Firm*—Evenson, Wands, Edwards, Lenahan & McKeown

[57] ABSTRACT

A process for adjusting the boost pressure in an internal-combustion engine, supercharged by an exhaust-gas turbocharger with adjustable turbine diffuser, to a predetermined desired boost-pressure value dependent on the operating point. To improve the efficiency of the internal-combustion engine in the non-steady-state mode, especially after a positive load change out of low load and speed ranges, or, after a positive load change during the non-stead-state mode, below a predetermined threshold value for the exhaust-gas counterpressure upstream of the turbine the boost pressure is regulated according to a first characteristic corresponding to the instantaneous true deviation of the actual boost-pressure value from the desired boost-pressure value. After this threshold value has been exceeded, the exhaust-gas counterpressure is regulated predetermining hypothetical control deviations for the boost-pressure control circuit according to a special characteristic.

3 Claims, 2 Drawing Sheets

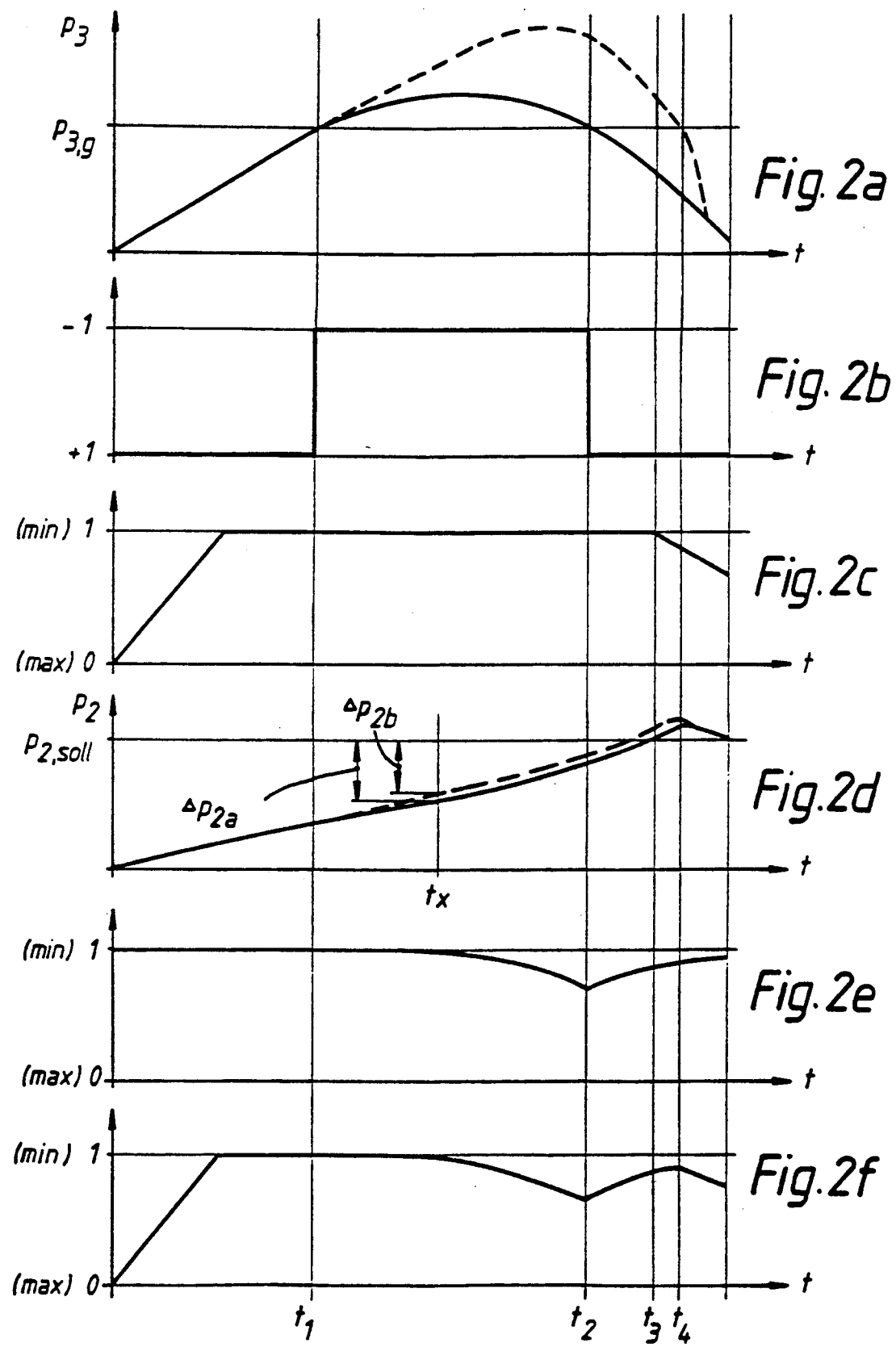

PROCESS FOR CONTROLLING THE BOOST PRESSURE IN AN INTERNAL-COMBUSTION ENGINE SUPERCHARGED BY AN EXHAUST-GAS TURBOCHARGER OF ADJUSTABLE TURBINE GEOMETRY

BACKGROUND AND SUMMARY OF THE INVENTION

The present to a process for controlling the boost pressure in an internal-combustion engine, supercharged by an exhaust-gas turbocharger of adjustable turbine geometry, to a predetermined desired value dependent on the operating point.

In a process known from Japanese Patent Document JP-A 60-56127, after a positive load change the adjustable turbine diffuser is transferred into a position reducing the flow cross-section, with the result that an improved response behavior of the exhaust-gas turbocharger is achieved. The disadvantage of this process is that the boost pressure $p_2$, that is to say the pressure downstream of the compressor, which is a measure of the filling ratio and therefore of the engine torque, does not increase with the speed, as is true of the pressure $p_3$ upstream of the turbine (exhaust-gas counterpressure). This leads to the occurrence of uncontrolled $p_3$ rises. In these operating ranges, therefore, the internal-combustion engine has to push out against a relatively high exhaust-gas counterpressure, this entailing a reduction efficiency.

To reduce the fuel consumption as a result of too high an exhaust-gas counterpressure level after the reduction of the flow cross-section, according to German Patent Document 3,624,248 the turbine diffuser is transferred continuously in the direction of the opening position again with the increase in the boost pressure due to the load increase, specifically until a boost pressure corresponding to the instantaneous load predetermination point has been set. Since the behavior of the exhaust-gas counterpressure $p_3$ after the change of the load predetermination is ignored completely here, the undesirable $p_3$ rises occur here too as a result of the relatively slow increase of the boost pressure $p_2$ in comparison with the exhaust-gas counterpressure $p_3$.

An object of the present invention is to provide a process for controlling the boost pressure by which, in the non-steady-state mode of the internal-combustion engine, especially after a positive load change out of low load and speed ranges, an improvement in the efficiency of the internal-combustion engine is obtained.

This and other objects are achieved by the present invention which provides a process for controlling the boost pressure in an internal-combustion engine, supercharged by an exhaust-gas turbocharger with adjustable turbine diffuser, to a predetermined desired boost-pressure value dependent on the operating point. After a positive change of the internal-combustion engine load, the turbine diffuser is transferred into a position reducing a flow cross-section onto the turbine. After the positive load change during a non-steady-state mode, boost pressure is regulated according to a first characteristic, corresponding to the instantaneous true deviation of the actual boost-pressure value from the desired boost-pressure value, for the regulating variable for controlling the turbine diffuser. The regulation of the boost pressure takes place according to the first characteristic only below a predetermined threshold value for the exhaust-gas counterpressure upstream of the turbine. After the predetermined threshold value has been exceeded, the boost pressure is regulated according to a second characteristic, the second characteristic being based on a hypothetical deviation of the actual boost-pressure value from the desired boost-pressure value, the amount of which is larger than the instantaneous true deviation.

The process according to the present invention prevents the possibility that, after a positive load change, uncontrolled pressure rises will occur in the exhaust-gas line upstream of the turbine during the actual increase in the boost pressure ($p_2$). Since the internal-combustion engine consequently no longer has to push out against a raised exhaust-gas counterpressure, an increased efficiency of the internal-combustion engine is afforded. Furthermore, with the process according to the present invention a simple and therefore cost-effective limit-pressure switch changing its switching state at a specific limit pressure $p_{3,G}$ can be used as a transmitter for the exhaust-gas counterpressure $p_3$.

The objects of the invention are also achieved by the present invention which provides an arrangement for controlling the boost pressure in an internal-combustion engine, supercharged by an exhaust-gas turbocharger with adjustable turbine diffuser, to a predetermined desired boost-pressure value dependent on the operating point. The arrangement comprises a compressor arranged in an intake line, a turbine arranged in an exhaust gas line, and an electronic control unit which receives a first signal corresponding to a current internal-combustion engine load and a second signal corresponding to a current internal-combustion engine speed and which generates a regulating-value signal for controlling the turbine diffuser. A pressure sensor is arranged in the intake line downstream of the compressor and is connected to the electronic control unit via a measured-value line. A pressure switch is arranged in the exhaust-gas line upstream of the turbine and is coupled to the electronic control unit via a line. The pressure switch has two switch positions, a switching state of said pressure switch being transmitted to the electronic control unit via the line.

Other objects, advantages and novel features of the present invention will become apparent from the following detailed description of the invention when considered in conjunction with the accompanying drawings.

BRIEF DESCRIPTION OF THE DRAWINGS

FIG. 2a shows a graph $p_3 = f(t)$ of the time trend of the exhaust-gas counterpressure after a positive load change.

FIG. 2b shows a graph of the time trend of the switching position of the limit-pressure switch designated by 21 in FIG. 1.

FIG. 2c shows a graph of the time trend of the regulating variable for controlling the servomotor designated by 8 in FIG. 1 in a conventional $p_2$ control.

FIG. 2d shows a graph $p_2 = f(t)$ of the time trend of the desired boost-pressure value $p_{2,des}$ and of the actual boost-pressure value $p_2$ after a positive load change.

FIG. 2e shows a graph of the time trend of the hypothetical regulating variable for controlling the servomotor designated by 8 in FIG. 1 after a positive load change.

FIG. 2f shows a graph of the time trend of the regulating variable, corrected by the process according to the invention, for controlling the servomotor designated by 8 in FIG. 1 for $p_2$ control after a positive load change.

DETAILED DESCRIPTION OF THE DRAWINGS

Figure 1:
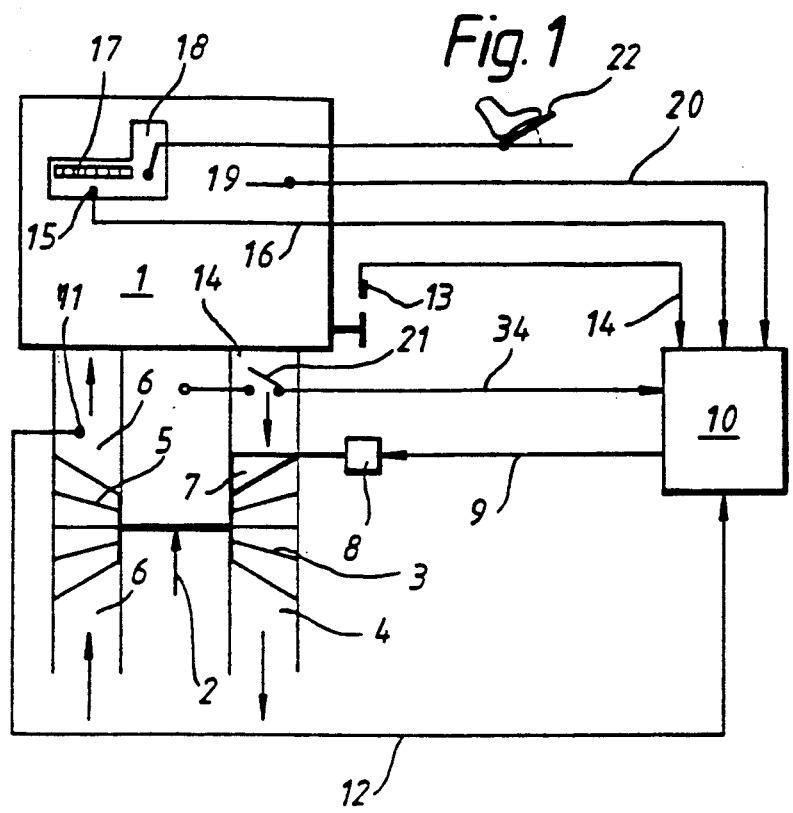
FIG. 1 shows a schematic representation of a device for carrying out the process according to a embodiment of the present invention.

FIG. 1 shows a diesel internal-combustion engine 1 with an exhaust-gas turbocharger 2, the turbine 3 of which is arranged in the exhaust-gas line 4 and the compressor 5 of which is arranged in the intake line 6. To improve the response behavior of the exhaust-gas turbocharger 2 in the event of a positive load change, especially out of low load and speed ranges, the turbine 3 has a turbine diffuser 7, indicated merely diagrammatically in the drawing for the sake of clarity, by means of which the direction of flow of the exhaust gases onto the turbine blades and the flow cross-section itself can be varied.

The diffuser 7 is actuated by a servomotor 8 which is controlled by an electronic control unit 10 via the control line 9. This control unit 10 receives via the sensor 11 and the measured-value line 12 a signal corresponding to the current boost pressure $p_2$; via the sensor 13 and the measured-value line 14 a signal corresponding to the current internal-combustion engine speed n; via the sensor 15 and the measured-value line 16 a signal corresponding to the current internal-combustion engine load $x_{RS}$ (deflection of the control rod 17 of the injection pump 18); and via the sensor 19 and the measured-value line 20 a signal corresponding to the current coolant temperature $T_{KM}$ of the internal-combustion engine 1. Via the measured-value line 34, the electronic control unit 10 receives a signal corresponding to the switching state of a pressure switch 21 arranged in the exhaust-gas line 4 upstream of the turbine 3. This limit-pressure switch 21 changes its switching state from +1 to −1 to when a predetermined threshold value $p_{3,G}$ for the exhaust-gas counterpressure $p_3$ is exceeded.

Now when the driver predetermines a positive load change, such as, for example, from idling to full load (depression of the accelerator pedal 22), the turbine diffuser 7 is first transferred into its closing position, that is to say into its position reducing the flow cross-section for the exhaust gases onto the turbine 3 to a minimum. This takes place according to the characteristic represented in FIG. 2c for the regulating variable for controlling the turbine diffuser 7. (For the graphs shown in FIGS. 2a to 2f the time t is plotted on the abscissa, the positive load change occurring at the time 0.) In the graph of FIG. 2c, the output signal of the electronic control unit 10 for the servomotor 8 (regulating variable) is plotted on the ordinate, an output signal of 0 corresponding to the position (max) opening the maximum flow cross-section and an output signal of 1 corresponding to the position (min) of the turbine diffuser 7 opening the minimum flow cross-section.

After the diffuser has been transferred into the "min" position, the turbine 3 is subjected to the exhaust gas at a relatively high flow velocity, this in turn bringing about a good response of the exhaust-gas turbocharger 2, that is to say a relatively rapid build-up of the boost pressure $p_2$ downstream of the compressor 5. Now since the flow cross-section onto the turbine 3 is at a minimum, however, the exhaust-gas counterpressure $p_3$ increases very quickly, so that, even before the boost pressure $p_2$ reaches the desired value $p_{2,des}$ corresponding to this operating point (full load), the exhaust-gas counterpressure $p_3$ has risen excessively, this being detrimental to the efficiency of the internal-combustion engine 1. This situation is evident from the two graphs of FIGS. 2a and 2d. Thus, the broken curve in the graph of FIG. 2a represents the time trend of the exhaust-gas counterpressure $p_3$ in a conventional boost-pressure control without the process according to the invention, while the broken curve of the graph of FIG. 2d represents the simultaneous trend of the boost pressure $p_2$ downstream of the compressor, likewise without the use of the process according to the invention.

It can be seen clearly that, even before the boost pressure $p_2$ the desired value $p_{2,des}$ predetermined for this operating state, excessive rises of the exhaust-gas counterpressure $p_3$ occur in the exhaust-gas line 4 upstream of the turbine 3.

Furthermore, the graph of FIG. 2e represents the trend of the output signal for the servomotor 8 of the turbine diffuser 7 which would be necessary if the exhaust-gas counterpressure $p_3$ were regulated directly in order to make it possible to prevent the pressure rises. The same applies to the dimension of the ordinate as to FIG. 2c. After the positive load change up to the time $t_1$, therefore, the turbine diffuser 7 would be in its position opening only the minimum flow cross-section. From the moment when the limit value $p_{3,G}$ (time $t_1$) was reached, the control of $p_3$ would commence, that is to say up to the time $t_2$ the flow cross-section would be increased continuously in order to prevent the undesirable rise of the exhaust-gas counterpressure $p_3$. Subsequently, after the exhaust-gas counterpressure $p_3$ has fallen below the threshold value $p_{3,G}$ again, the turbine diffuser would be moved in the closing direction once more. To regulate the exhaust-gas counterpressure $p_3$, however, a pressure sensor would be necessary in the exhaust-gas line 4 upstream of the turbine 3 for the feedback of the particular actual value of the exhaust-gas counterpressure $p_3$. But because of the extreme temperature conditions in the exhaust-gas line, sensors of this type are highly inaccurate and susceptible to faults and moreover are relatively expensive.

According to the invention, therefore, in the exhaust-gas line 4 upstream of the turbine 3 there is arranged the limit-pressure switch 21 which changes its switching state from +1 to −1 at exactly the time $t_1$ from which the exhaust-gas counterpressure $p_3$ rises above a predetermined threshold value $p_{3,G}$. The trend of the output signal of the limit-pressure switch 21 is shown in the graph of FIG. 2b. As long as the switching state of the limit-pressure switch 21 is still +1 (up to the time $t_1$), the control of the servomotor 8 still takes place according to the first segment of the graph of FIG. 2c, that is to say the boost pressure $p_2$ is readjusted according to a first characteristic, corresponding to the instantaneous true deviation of the actual boost-pressure value $p_2$ from the desired boost-pressure value $p_{2,des}$, for the regulating variable for controlling the turbine diffuser.

From the time $t_1$, however, the characteristic of FIG. 2c is replaced by the characteristic of FIG. 2e, that is to say, although the desired boost-pressure value $p_{2,des}$ is not yet reached (see FIG. 2d), the turbine diffuser 7 is transferred in the direction of the opening position (the characteristic trend according to the invention is shown in the graph of FIG. 2f, the same being true of the dimension of the ordinate as for FIGS. 2c and 2e). The result of this is that the boost pressure $p_2$ admittedly goes towards its desired value $p_{2,des}$ slightly more slowly (unbroken curve in FIG. 2d). But the trend of the exhaust-gas counterpressure $p_3$ no longer has the extreme and efficiency-reducing rises (unbroken curve of FIG. 2a). This means, in other words, that, after the threshold value $p_{3,G}$ for the exhaust-gas counterpressure $p_3$ has been exceeded, the boost pressure $p_2$ is regulated according to a second characteristic which is based, in relation to a respective instantaneous time $t_x$, on a hypothetical deviation of the actual value $p_2$ from the desired value $p_{2,des}$, the amount $\Delta p_{2a}$ of which is larger than the amount $\Delta p_{2b}$ of the instantaneous true deviation of the actual boost-pressure value $p_2$ from the desired boost pressure $p_2$ downstream of the compressor is not regulated according to the true deviation of the actual value $p_2$ from the desired value $p_{2,des}$, as occurs in the range up to $t_1$, but according to a hypothetical deviation. The regulation of the boost pressure $p_2$ according to a hypothetical deviation consequently has exactly the same effect on the trend of the exhaust-gas counterpressure $p_3$ as if the exhaust-gas counterpressure $p_3$ itself were being regulated. In other words, it can therefore also be stated that, in this range, the exhaust-gas counterpressure $p_3$ is "regulated" by means of the boost-pressure control circuit, specifically in that hypothetical control deviations are predetermined for the boost-pressure control circuit according to a special characteristic.

According to the present invention, the trend of this characteristic predetermining an imaginary deviation and intended for controlling the servomotor 8 is determined by the electronic control unit 10, specifically as a function of the variables: pressure-rise change in the supercharging-air line 6 (suction pipe) $d_{p2}/dt$, internal-combustion engine speed n, its time change $dn/dt$ and coolant temperature $T_{KM}$. In other embodiments of the present invention, the characteristic can also be determined as a function of only one, two or three of these parameters.

The regulation according to which the characteristic predetermining the hypothetical deviation takes place up to the time $t_4$, from which a lower value for controlling the servomotor 8 is predetermined by the hypothetical characteristic (see FIG. 2e) than by the characteristic on which the true deviation is based (see FIG. 2c) (minimum selection). Thus, as long as the hypothetical characteristic still predetermines a larger opening position of the turbine diffuser 7, the servomotor 8 is still controlled according to this characteristic in order to actuate it. Finally, from this time $t_4$, the usual boost-pressure control according to the characteristic of FIG. 2c is active again.

The time $t_3$ denotes the time at which the actual boost-pressure value $p_2$ reaches the desired value $p_{2,des}$, by the use of the process according to the invention (FIG. 2d).

Figure 3:
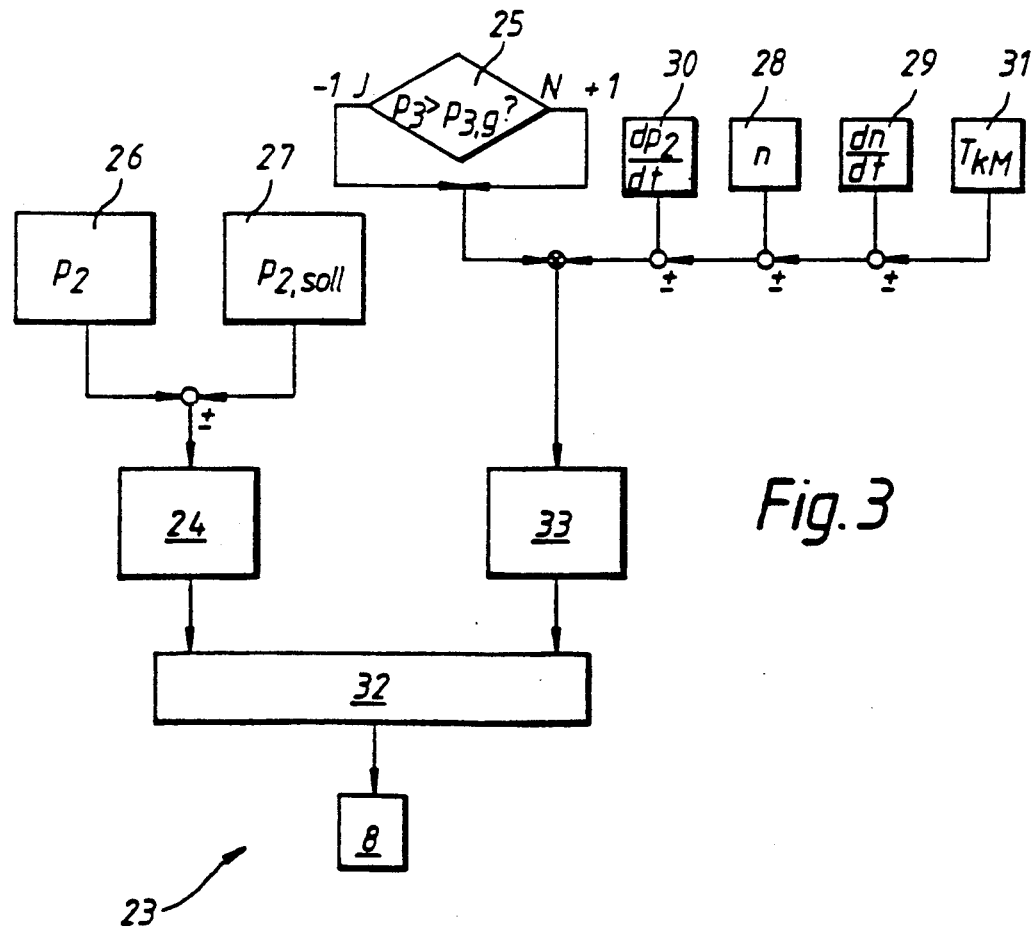
FIG. 3 shows the operating mode of the electronic control unit designated by 10 in FIG. 1 in the form of a block diagram.

FIG. 3 further illustrates the process according to the invention by a block diagram 23. As already stated, as long as the limit value $p_{3,G}$ is not yet reached, a completely conventional control of the boost pressure $p_2$ takes place. That is to say, the servomotor 8 or the turbine diffuser 7 is readjusted via the block 24 according to the true deviation of the actual value $p_2$ from the desired value $p_{2,des}$ (from the blocks 26 and 27). In this range, the switching state of the limit-pressure switch 21 is still at +1 (right-hand output of the interrogation block 25). From the time $t_1$, that is to say from when the limiting exhaust-gas counterpressure $p_{3,G}$ is reached, the limit-pressure switch changes its switching state to −1 (left-hand output of the interrogation block 25). This means that the turbine diffuser 7 is to be moved in the direction of the opening position, with the result that the boost pressure $p_2$ goes minimally more slowly towards the desired value $p_{2,des}$, but a substantially flatter trend of the exhaust-gas counterpressure $p_3$ is obtained (see the unbroken curve of FIG. 2a). The time trend according to which the diffuser 7 is transferred in the direction of the opening position depends on the hypothetical deviation, determined via the blocks 28–31, of the boost pressure $p_2$ from the desired value $p_{2,des}$. According to this time function, a signal corresponding to the characteristic of FIG. 2e from the time $t_1$ is now applied to the output of the block 33. Via the block 32 (a minimum selection block), that output signal of the two blocks 24 and 33 which transfers the diffuser 7 into the further-opened position is switched through to the servomotor 8, that is to say from the time $t_1$ the output signal of the block 33 is therefore first switched through. The relationship between the characteristic curve determined from the hypothetical deviation and the values of blocks 28–31 are determined by testing and entered into a characteristic diagram.

When the value of the exhaust-gas counterpressure $p_3$ falls below the limit value $p_{3,g}$ (at the time $t_2$), the limit-pressure switch 21 changes its switching state to +1 again, this in turn meaning that the diffuser 7 can be moved once more in the direction of the closing position, especially as the desired boost-pressure value $p_{2,des}$ is not yet reached (see the unbroken curve of FIG. 2d). The time function according to which the diffuser 7 is transferred in the direction of the closing position depends, in turn, on the hypothetical deviation of the boost pressure $p_2$ from the desired value $p_{2,des}$ determined via the blocks 28–31. According to this time function, therefore, the output signal corresponding to the characteristic of FIG. 2e (now of course from the time $t_2$) is applied again to the output of the block 33. Via the minimum-selection block 32, the output signal of the block 33 is switched through to the servomotor 8 until this signal is once again higher than the output signal of the block 24. Since the boost pressure $p_2$ has reached its desired value $p_{2,des}$ in the meantime, the control of the boost pressure $p_2$ according to the true deviation (output signal of the block 24) also predetermines that the diffuser 7 is once again to be transferred in the direction of the closing position (see the characteristic of FIG. 2c from the time $t_3$). As stated above, however, the signal corresponding to this characteristic is switched through to the servomotor 8 only when it is lower than the output signal of the block 33, that is to say when a larger opening position is predetermined for the diffuser 7 by the block 24 than by the block 33. This occurs from the time $t_4$. From this time $t_4$, the boost pressure $p_2$ is regulated in a completely conventional way according to the true deviation of the actual value from the desired value, specifically once again until, after a new positive load change, the exhaust-gas counterpressure $p_3$ has once more exceeded the predetermined limit value $p_{3,G}$.

Thus, after a positive load change, the servomotor 8 is controlled via the output of the minimum-selection block 32 according to the characteristic represented in FIG. 2f, thereby obtaining a trend of the exhaust-gas counterpressure $p_3$ according to the unbroken curve of FIG. 2a without pronounced pressure rises and at the same time with a boost pressure $p_2$ increasing minimally more slowly (see the unbroken curve of FIG. 2d).

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A process for controlling the boost pressure in an internal-combustion engine, supercharged by an exhaust-gas turbocharger with adjustable turbine diffuser, to a predetermined desired boost-pressure value dependent on the operating point, comprising:

after a positive change of the internal-combustion engine load, transferring the turbine diffuser into a position reducing a flow cross-section onto the turbine;

after the positive load change during a non-steady-state mode, regulating boost pressure according to a first characteristic, corresponding to the instantaneous true deviation of the actual boost-pressure value from the desired boost-pressure value, for the regulating variable for controlling the turbine diffuser, the regulation of the boost pressure taking place according to the first characteristic only below a predetermined threshold value for the exhaust-gas counterpressure upstream of the turbine; and after the predetermined threshold value has been exceeded, regulating the boost pressure according to a second characteristic, the second characteristic being based on a hypothetical deviation of the actual boost-pressure value from the desired boost-pressure value, the amount of which is larger than the instantaneous true deviation.

2. Process according to claim 1, wherein the second characteristic is determined as a function of at least one operating parameter of the internal-combustion engine.

3. Process according to claim 2, wherein the operating parameters for determining the second characteristic are at least one of: a pressure-rise change in a supercharging-air line; internal combustion engine speed; a time change of the internal-combustion engine speed; and a coolant temperature.

* * * * *